US012688194B2

(12) United States Patent
Destefanis et al.

(10) Patent No.: US 12,688,194 B2
(45) Date of Patent: Jul. 21, 2026

(54) COMPUTER-IMPLEMENTED SYSTEM AND METHOD FOR MANAGING LARGE BLOCKS OVER A BLOCKCHAIN NETWORK

(71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 612 days.

(21) Appl. No.: 16/620,441

(22) PCT Filed: Jun. 5, 2018

(86) PCT No.: PCT/IB2018/054007
§ 371 (c)(1),
(2) Date: Dec. 6, 2019

(87) PCT Pub. No.: WO2018/224955
PCT Pub. Date: Dec. 13, 2018

(65) Prior Publication Data
US 2021/0083852 A1 Mar. 18, 2021

(30) Foreign Application Priority Data

Jun. 7, 2017 (GB) ..................................... 1709098
Jun. 7, 2017 (GB) ..................................... 1709099

(51) Int. Cl.
*G06F 16/2458* (2019.01)
*G06F 16/182* (2019.01)
(Continued)

(52) U.S. Cl.
CPC ...... *G06F 16/2465* (2019.01); *G06F 16/1837* (2019.01); *G06F 21/64* (2013.01);
(Continued)

(58) Field of Classification Search
CPC .. G06F 16/2465; G06F 16/1837; G06F 21/64; H04L 9/0643; H04L 9/3239;
(Continued)

(56) References Cited

U.S. PATENT DOCUMENTS 9,110,792 B1 * 8/2015 Douglis ............... G06F 12/0269
9,703,644 B1 * 7/2017 Jagannatha ......... G06F 11/1451
(Continued)

FOREIGN PATENT DOCUMENTS

CN 106548349 A 3/2017
WO 2017004527 A1 1/2017
(Continued)

OTHER PUBLICATIONS

Andresen, "O(1) block propagation," GitHub, retrieved from https://web.archive.org/web/20160817133304/https://gist.github.com/gavinandresen/e20c3b5a1d4b97f79ac2, Aug. 17, 2017, 11 pages.
(Continued)

*Primary Examiner* — Blake I Narramore
(74) *Attorney, Agent, or Firm* — Tarolli, Sundheim, Covell & Tummino LLP

(57) ABSTRACT

Computer-implemented methods and systems suitable for implementation in nodes of a blockchain network are provided. Modified blockchain node structures, network architectures, and protocols for handling large numbers of transactions and large transaction blocks are described. A computer-implemented method for a node of a blockchain network is described which includes: receiving mined data from the blockchain network corresponding to a plurality of validated transactions; assembling blocks based on said mined data; and sending assembled blocks to a storage entity for storing on a blockchain.

13 Claims, 6 Drawing Sheets

(51) Int. Cl.

| | |
|---|---|
| *G06F 21/64* | (2013.01) |
| *G06Q 20/36* | (2012.01) |
| *H04L 9/00* | (2022.01) |
| *H04L 9/06* | (2006.01) |
| *H04L 9/32* | (2006.01) |
| *H04L 67/1074* | (2022.01) |
| *H04L 67/1087* | (2022.01) |

(52) U.S. Cl.
CPC .......... *H04L 9/0643* (2013.01); *H04L 9/3239* (2013.01); *H04L 67/1074* (2013.01); *H04L 67/1091* (2013.01); *H04L 67/1093* (2013.01); *G06Q 20/3672* (2013.01); *H04L 9/50* (2022.05); *H04L 2209/30* (2013.01)

(58) Field of Classification Search
CPC ............. H04L 67/1074; H04L 67/1091; H04L 67/1093; H04L 2209/38; H04L 2209/56; G06Q 20/3672
See application file for complete search history.

(56) References Cited

U.S. PATENT DOCUMENTS

| | | | | |
|---|---|---|---|---|
| 9,825,931 | B2 * | 11/2017 | Johnsrud | H04L 63/08 |
| 10,068,228 | B1 * | 9/2018 | Winklevoss | G06Q 20/36 |
| 10,318,938 | B2 * | 6/2019 | Johnsrud | G06Q 20/405 |
| 2014/0136762 | A1 * | 5/2014 | Li | G06F 16/22 |
| | | | | 711/103 |
| 2015/0199416 | A1 | 7/2015 | Kashyap et al. | |
| 2015/0287026 | A1 | 10/2015 | Yang et al. | |
| 2015/0310424 | A1 | 10/2015 | Myers | |
| 2016/0259937 | A1 | 9/2016 | Ford et al. | |
| 2016/0292672 | A1 * | 10/2016 | Fay | G06Q 20/3829 |
| 2016/0342977 | A1 * | 11/2016 | Lam | G06Q 20/0658 |
| 2016/0342989 | A1 * | 11/2016 | Davis | H04L 9/50 |
| 2017/0005804 | A1 * | 1/2017 | Zinder | H04L 63/123 |
| 2017/0017435 | A1 * | 1/2017 | Peeters | G06F 3/067 |
| 2017/0075941 | A1 * | 3/2017 | Finlow-Bates | H04L 9/3239 |
| 2017/0091756 | A1 * | 3/2017 | Stern | G06F 16/951 |
| 2017/0132630 | A1 * | 5/2017 | Castinado | G06Q 20/4014 |
| 2017/0140408 | A1 * | 5/2017 | Wuehler | G06Q 30/0207 |
| 2017/0195747 | A1 * | 7/2017 | Haberman | H04N 21/858 |
| 2017/0213221 | A1 * | 7/2017 | Kurian | G06Q 20/4014 |
| 2017/0214675 | A1 * | 7/2017 | Johnsrud | H04L 9/3242 |
| 2017/0214699 | A1 * | 7/2017 | Johnsrud | H04L 9/3236 |
| 2017/0228731 | A1 | 8/2017 | Sheng et al. | |
| 2017/0236123 | A1 * | 8/2017 | Ali | G06Q 20/401 |
| | | | | 705/75 |
| 2017/0243177 | A1 * | 8/2017 | Johnsrud | G06Q 20/10 |
| 2017/0243209 | A1 * | 8/2017 | Johnsrud | H04M 15/854 |
| 2017/0243212 | A1 | 8/2017 | Castinado et al. | |
| 2017/0243286 | A1 | 8/2017 | Castinado et al. | |
| 2017/0316391 | A1 | 11/2017 | Peikert et al. | |
| 2017/0345011 | A1 | 11/2017 | Salami et al. | |
| 2017/0346833 | A1 * | 11/2017 | Zhang | G06F 16/951 |
| 2018/0039667 | A1 * | 2/2018 | Pierce | H04L 9/3247 |
| 2018/0109541 | A1 * | 4/2018 | Gleichauf | H04W 12/06 |
| 2018/0121909 | A1 * | 5/2018 | Christidis | H04L 9/3236 |
| 2018/0139042 | A1 * | 5/2018 | Binning | G06Q 20/1235 |
| 2018/0150835 | A1 * | 5/2018 | Hunt | H04L 9/3236 |
| 2018/0204213 | A1 | 7/2018 | Zappier et al. | |
| 2018/0276626 | A1 * | 9/2018 | Laiben | G06Q 20/3829 |
| 2018/0294967 | A1 | 10/2018 | Roberts et al. | |
| 2018/0336552 | A1 * | 11/2018 | Bohli | G06Q 20/065 |
| 2019/0199515 | A1 | 6/2019 | Carver et al. | |
| 2020/0021312 | A1 | 1/2020 | Jeong et al. | |
| 2020/0167341 | A1 | 5/2020 | Carver | |
| 2020/0213132 | A1 | 7/2020 | Zinder | |
| 2021/0112063 | A1 | 4/2021 | Castinado et al. | |

FOREIGN PATENT DOCUMENTS

| | | | |
|---|---|---|---|
| WO | 2017011601 | A1 | 1/2017 |
| WO | 2017079652 | A1 | 5/2017 |
| WO | 2017112664 | A1 | 6/2017 |
| WO | 2017162904 | A1 | 9/2017 |

OTHER PUBLICATIONS

Antonopoulos, "Mastering Bitcoin—Unlocking Digital Cryptocurrencies," O'Reilly Media, Inc., Dec. 20, 2014, 282 pages.
Back, "Bitcoin Core Slack Archive," retrieved from https://slack.bitcoincore.org/logs/general/2016-01-23/, Jan. 23, 2016, 724 pages.
Bitfreak, "Blockchain-less P2P Currency (theoretical idea)" retrieved from https://bitcointalk.org/index.php?topic=152662.0, Aug. 16, 2017, 8 pages.
Corallo, "Bitcoin-Wizards Log," retrieved from http://gnusha.org/bitcoin-wizards/2017-01-16.log, Jan. 16, 2017, 18 pages.
Erasmospunk, "Bip-Soft-Blocks. Mediawiki, " retrieved from https://gist.github.com/erasmospunk/23040383b7620b525df0, Dec. 1, 2015, 9 pages.
Gavin, "Technical Discussion of Gavin's O(1) Block Propagation Proposal," retrieved from https://www.reddit.com/r/Bitcoin/comments/2d7ofh/technical_discussion_of_gavins_01_block, Aug. 11, 2014, 66 pages.
Gervais et al., "On the Privacy Provisions of Bloom Filters in Lightweight Bitcoin Clients," International Association for Cryptologic Research, Oct. 13, 2014, 11 pages.
Goodrich et al., "Invertible Bloom Lookup Tables," 49th Annual Allerton Conference on Communication, Control, and Computing, Sep. 28, 2011, 24 pages.
International Search Report and Written Opinion mailed Aug. 14, 2018, Patent Application No. PCT/IB2018/054006, 11 pages.
International Search Report and Written Opinion mailed Aug. 21, 2018, Patent Application No. PCT/IB2018/054007, 8 pages.
Jegutanis, "Efficient Block Relay Format and Mempool Soft Consensus, " retrieved from https://web.archive.org/web/20160817133304/https://gist.github.com/gavinandresen/e20c3b5a1d4b97f79ac2, Jan. 21, 2016, 8 pages.
Jovanovic, "ByzCoin: Securely Scaling Blockchains," retrieved from http://hackingdistributed.com/2016/08/04/byzcoin/, Aug. 4, 2016, 19 pages.
Kokoris-Kogias et al., "Enhancing Bitcoin Security and Performance with Strong Consistency via Collective Signing," 2016, 17 pages.
Maxwell, "Transcript for #Bitcoin-Dev," retrieved from http://bitcoinstats.com/irc/bitcoin-dev/logs/2015/12/02, Dec. 12, 2015, 9 pages.
Nakamoto, "Bitcoin: A Peer-to-Peer Electronic Cash System," Bitcoin, Oct. 31, 2008, https://bitcoin.org/bitcoin. pdf, 9 pages.
Rosenbaum, "Bitcoin Block Propagation with IBLT, Part 1: Infographic," retrieved from http://popeller.io/index.php/2015/10/09/bitcoin-block-propagation-with-iblt-infographic/, Oct. 9, 2015, 7 pages.
Russell, "Playing with Invertible Bloom Lookup Tables and Bitcoin Transactions," Pettycoin, retrieved from http://rustyrussell.github.io/pettycoin/2014/11/05/Playing-with-invertible-bloom-lookup-tablesand-bitcoin-transactions.html, Nov. 5, 2014, 9 pages.
Satoshi et al., "Connection Limits," Bitcoin Forum, Aug. 9, 2010, https://bitcointalk.org/index.php?topic=741.0;prev_next=prev, 2 pages.
Svendsen, "[bitcoin-dev] Separating mining from tx verification by enabling paying to valid POW header," Linux Foundation, Jan. 24, 2017 [retrieved Aug. 10, 2017], https://lists.linuxfoundation.org/pipermail/bitcoin-dev/2017-January/013475.html, 2 pages.
UK Commercial Search Report mailed Aug. 23, 2017, Patent Application No. GB1709098.6, 8 pages.
UK IPO Search Report mailed Nov. 16, 2017, Patent Application No. GB1709098.6, 5 pages.
Zander, "Mempool Saving Feature Between Restarts—Issue #251," retrieved from https://github.com/bitcoinclassic/bitcoinclassic/issues/251, Apr. 9, 2017, 4 pages.

(56) References Cited

OTHER PUBLICATIONS

Maxwell, "[Bitcoin-Dev] Validationless Mining Without Transactions," retrieved from https://lists.linuxfoundation.org/pipermail/bitcoin-dev/2017-May/014340.html, May 15, 2017, 15 pages.

Nagata, et al., "A Study on a Method of Identity Verification in Blockchains", IPSJ SIG Technical Report, vol. 2017-DPS-170 No. 19, 2017, Information Processing Society of Japan, 12 pages.

Narayanan et al., "Bitcoin and Cryptocurrency Technologies" Feb. 9, 2016, 308 pages.

Franco, "Understanding Bitcoin: Cryptography, Engineering, and Economics," Wiley ISBN: 9781119019169, 238 pages.

Hearn, Michael, "Connection Bloom Filtering", Peer Services, Oct. 24, 2012, 8 pages.

\* cited by examiner

Block

Magic No - 4 bytes

Block size - 4 bytes

Block header - 80 bytes

Tx count - 1 → 9 bytes

Transactions - VarInt

COMPUTER-IMPLEMENTED SYSTEM AND METHOD FOR MANAGING LARGE BLOCKS OVER A BLOCKCHAIN NETWORK

FIELD OF INVENTION

This specification relates generally to computer-implemented methods and systems suitable for implementation in nodes of a blockchain network. Modified blockchain node structures, network architectures, and protocols for handling large numbers of transactions and large transaction blocks are described. The invention is particularly suited, but not limited, to use with the Bitcoin blockchain.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the crypto-graphic security system Bitcoin is based on and the data that can be stored on the blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof record of events, distributed processing etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

US2015/0287026 discloses a hot wallet service system. The hot wallet service system receives financial transactions from one or more user devices, authenticates the financial transactions using a plurality of authentication servers implementing a multi-signature authentication system, aggregates the digital signatures, and propagates the authenticated financial transaction into a virtual currency network. Once the financial transaction is propagated through the virtual currency network, the financial transaction can be incorporated into a public shared ledger by a miner entity of the virtual currency network in the usual manner.

CN106548349 relates to the problem that if every node in a blockchain network is required to verify the transaction information for every transaction then this process generates a considerable workload and puts a lot of pressure on the nodes. The solution described in CN106548349 is to propagate transaction information from a first node to a plurality of selected second nodes in order to verify the transaction information rather than requiring that all nodes need to verify the transaction information. The second nodes are selected in a random, irregular manner to prevent the possibility of malicious fraud and without the need for every node to verify the transaction information.

WO2017/162904 is directed to a blockchain based resource management system in which transaction delay is reduced and resource double spending is alleviated by verifying a transaction before a new block is established in the resource management system. At least one verification node is provided to verify a transaction and provide a verification acceptance message to a merchant to release an item to a customer. As such, a sale can be reliably completed without waiting for the next block of the blockchain to be established. It is also disclosed that the verification node can distribute the verification request to a set of verification nodes and receive responses from the set of verification nodes. The verification node may then transmit the verification acceptance message to a merchant if, and only if, none of the responses from the set of verification nodes is a rejection for the transaction. It is further disclosed that when the time comes to establish a block in the blockchain, a node establishing the block may compile a set of transactions that have taken place since the most recent established block, the next block comprising this set of transactions.

US2016/0259937, WO2017/004527, and WO2017/011601 describe how the current bitcoin blockchain network is configured and functions. In particular, individual transactions are propagated through the network and are incorporated into the blockchain via mining where a mining node selects a set of transactions, groups the transactions into a prototype block, and determines the value of a nonce in the conventional "proof of work" manner. Once a miner finds a valid nonce the block is validated by the other nodes and incorporated into the blockchain.

US2015/0310424 discloses a system for generating user directory data through multi-modal cryptographic key address mapping. The crypto-currency network comprises cryptographic nodes to publically verify a set of transactions of users of the cryptographic currency. Nodes may participate in the crypto-currency network by relaying the transaction, maintaining a verification ledger, and/or mining for the cryptographic currency.

SUMMARY OF INVENTION

At the time of writing, the Bitcoin blockchain network is based on a blocksize which contains approximately 2000 transactions and a block is mined approximately every 10 minutes (the 10 minute block time was set as a compromise between first confirmation time and the time wasted on chain splits). This provides a transaction processing rate of approximately 3.5 transactions per second. In contrast, the VISA system operates with a transaction processing rate of approximately 10000 transactions per second and is capable of reaching 50000+ transactions per second.

It is clear that in order to create a competitive payment system, some sort of circumvention of the current constraints of the blockchain network will be necessary. As the 10 minute block time is well established, it is imperative to consider changes to the block size and thus the blockchain itself. In this specification a scalable solution is described that would be able to handle, for example, approximately 50000 transactions per second. Importantly, a solution is provided which can support high transaction rates while retaining a decentralized and distributed system architecture.

The transition from the current architecture of the Bitcoin network to one where large volumes of simultaneous transactions can be processed puts infrastructural pressure on the whole network. A system of nodes has been proposed that are able to validate and relay large numbers of transactions more efficiently and at greater speeds. Due to the volume of transactions a distributed approach has been proposed in the design of the mempool (pending transactions which have not yet been processed and stored on the blockchain). A vastly increased amount of transactions exerts a pressure on the block size, and when the block size exceeds a certain limit the question of storage infrastructure becomes an issue. In this specification a solution to the problem of processing and storing large, Gigabyte-sized blocks is described.

The present specification describes a modified blockchain network architecture, the modified architecture comprising a plurality of specialised transaction validation nodes which are configured to validate transactions and maintain a distributed, decentralised storage of validated transactions with other transaction validation nodes in the blockchain network. The transaction validation nodes are further configured to prepare lists of validated transactions for miners and also to create a commitment transaction for a digital asset in exchange for providing a list of validated transactions to a miner. As such, the specialised transaction validation nodes provide a service to the miners in terms of validating transactions, constructing lists of validated transactions, and providing these lists to miners in exchange for a fee. Once the transactions have been mined then the mined transactions are provided back to the transaction validation nodes which construct large blocks of mined transactions and store the large blocks in specialised storage nodes.

One aspect of the present invention is directed to post-mining functionality. A computer-implemented method for a node of a blockchain network is provided, the computer-implemented method comprising:

receiving mined data from the blockchain network corresponding to a plurality of validated transactions;
  assembling blocks based on said mined data; and
  sending assembled blocks to a storage entity for storing on a blockchain.

Such a method enables the nodes to construct large blocks to be stored on a storage entity without requiring miners to construct and store large blocks and transmit such blocks over the blockchain network. Further still, the architecture allows the use of large scale storage entities dedicated to storing a large and ever growing blockchain.

The computer-implemented method may further comprise:

receiving transactions from the blockchain network;
  validating transactions received from the blockchain network;
  maintaining a distributed, decentralized storage of validated transactions with other nodes in the blockchain network; and
  distributing data corresponding to said validated transactions to the blockchain network for mining, the data comprising lists of validated transactions. Each list can provide a complete list of validated transactions for mining into a block.

Such a method effectively takes away the requirement for miners to perform the validation function while retaining a distributed, decentralized storage of the validated transactions with other nodes in the blockchain network. Furthermore, the method enables transaction validation nodes to provide a service to miners by preparing and distributing data corresponding to validated transactions to the blockchain network for mining. For example, the method enables lists of validated transactions to be prepared and distributed.

The step of maintaining the distributed, decentralized storage of validated transactions with other transaction validation nodes in the blockchain network may comprise synchronizing transaction validation nodes on the blockchain network to maintain an up-to-date list of validated transactions in a decentralized and distributed manner. For example, the validation nodes can be synchronized by exchanging invertible bloom filter lookup tables. The validated transactions can also be sorted into a defined order such that a common ordering system is used across transaction validation nodes in the blockchain network for maintaining the distributed, decentralized storage of validated transactions. For example, a canonical ordering system can be used for maintaining the distributed, decentralized storage of validated transactions. It has been found that this is a particularly efficient way of retaining a decentralized and distributed storage while ensuring that transaction data across the network is maintained in a consistent manner.

The step of distributing data corresponding to the validated transactions to the blockchain network for mining can include preparing data corresponding to a list of validated transactions (such as an invertible bloom look up table and any accompanying data corresponding to a list of validated transactions, wherein the validated transactions are contained in blocks). Furthermore, the step of distributing data corresponding to the validated transactions to the blockchain network for mining can include creating a commitment transaction for a digital asset in exchange for providing the data corresponding to the list of validated transactions to a miner. For example, a hash (Merkle) tree, a Patricia tree, or another type of radix tree can be calculated with the commitment transaction included.

After the data corresponding to the validation transactions is distributed and mined by solving an associated cryptographic puzzle, e.g. a hash puzzle, the mined data is sent back to a transaction validation node rather than stored directly on the blockchain by the miners. This mined data can then be assembled into (large) blocks and stored either on a storage entity configured specifically for storage of large quantities of data and/or over a distributed storage system. As previously stated, this enables the validation nodes to construct large blocks to be stored on a storage entity without requiring miners to construct and store large blocks and transmit such blocks over the blockchain network. Further still, the architecture allows the use of large scale storage entities dedicated to storing a large an ever growing blockchain.

The mined data received from the blockchain network can include a block header corresponding to the validated transactions. The mined data can also include a transaction for a digital asset in exchange for assembling and or storing blocks based on the mined data. Furthermore, the method can include a requirement to waiting for a time period t associated with a minimum number of blocks prior to receiving the digital asset. This provides an incentive scheme for providing a validation node as the providers will be rewarded for providing lists of validated transactions (for example in the form of invertible bloom look up tables) for mining and/or for storing mined blocks on the blockchain. Requiring a minimum time period prior to receiving a digital asset incentivises miners to propagate skeleton blocks (including payment) to a range of nodes, and nodes will be incentivised to propagate skeleton blocks to other nodes.

The step of assembling blocks based on mined data can involve assembling large blocks with each block having a size of, for example, at least 2, 4, 6, 8, 10, 50, 100, 500, 1000, or 10000 megabytes. Although the upper limit will increase over time, a nominal upper value of 1 petabyte may be specified. Each block may comprise, for example, at least 5000, 10000, 500000, 100000, 500000 or 1000000 transactions. Although the upper limit will increase over time, a nominal upper value of $10^{12}$ transactions per block may be specified. As previously indicated, the method, node, and blockchain network architecture as described herein enables large blocks to be constructed and stored on a storage entity without requiring miners to construct and store large numbers of transactions. This enables the system to handle a vastly increased transaction rate.

In the methodology as described herein, the blocks may be modified to include a block header containing a random number provided by a miner. That is, the transaction validation nodes can be configured to process blocks which include a block header containing a random number provided by a miner when receiving solved transactions from the blockchain network. This constitutes a change to the block header whereby miners can choose or randomly generate a number which is inserted into the block header. This aids in ensuring that miners do not compete in trying to mine identical blocks even when the same list of transactions is selected by numerous miners.

The storage entity for storing the aforementioned large blocks of data can be shared between a plurality of transaction validation nodes on the blockchain network, the plurality of transaction validation nodes forming a super-node on the blockchain network, wherein the shared storage entity is either a common storage node, a distributed storage, or a combination of the two. This architecture leads to the formation of a super-node on the blockchain network and allows the provisions of dedicated storage facilities for storing the blockchain and servicing the blockchain network.

In light of the above, there is also provided a super-node of a blockchain network, the super-node comprising:

a plurality of validation nodes as previously described; and a shared storage entity for storing the blockchain, wherein the shared storage entity is either a common storage node, a distributed storage, or a combination of the two, and wherein blocks assembled by the plurality of validation nodes are sent to, and stored on, the shared storage entity whereby the shared storage entity maintains the blockchain.

This architecture is better suited to handling the large block sizes required to achieve the desired increase in transaction rates which is an aim of the method and configurations described herein. For example, the shared storage entity may be configured to have a storage capacity of at least 100 gigabytes, and more preferably at least 1, 10, 100, or 1000 terabytes of storage capacity. Although the upper limit will increase over time, a nominal upper value of $10^6$ terabytes or even $10^6$ yottabytes may be specified.

In terms of the overall network architecture, a blockchain network can be provided which comprises a plurality of such super-nodes. The super-nodes can be connected (but do not overlap) on the blockchain network and the shared storage entity of each super-node is configured to store a copy of the blockchain. The super-nodes effectively comprise a group of nodes which form a pool which functions as a super-node. In order to maintain the distributed nature of the blockchain, there should advantageously be a certain number of such super-nodes (e.g. at least 10, 50, 100, or 1000 and optionally less than 100,000,000).

Embodiments of the present invention can be provided in a variety of forms. For example, a computer readable storage medium can be provided which comprising computer-executable instructions which, when executed, configure a processor to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. Further still, a validation transaction node of a blockchain network can be provided, the validation transaction node configured to perform the method as described herein.

The invention as described herein is distinct over the prior art discussed in the background section as set out below. US2015/0287026 discloses that once a financial transaction is propagated through a virtual currency network, the financial transaction can be incorporated into a public shared ledger by a miner entity of the virtual currency network in a standard manner. As such, US2015/0287026 does not disclose a node which collects and constructs large blocks of mined transactions on behalf of the miners for storage on the blockchain using specialized storage nodes. Furthermore, US2015/0287026 does not disclose that mined data comprises a transaction for a digital asset in exchange for assembling blocks based on the mined data and/or for storage of the assembled blocks.

Similarly, CN106548349, WO2017/162904, US2016/0259937, WO2017/004527, WO2017/011601, and US2015/0310424 do not disclose a node which collects and constructs large blocks of mined transactions on behalf of the miners for storage on the blockchain using specialized storage nodes. Furthermore, these documents do not disclose that mined data comprises a transaction for a digital asset in exchange for assembling blocks based on the mined data and/or for storage of the assembled blocks. Rather, the documents disclose a standard mining procedure using the current blockchain network architecture where a mining node selects a set of transactions, groups the transactions into a prototype block, determines the value of a nonce in the conventional "proof of work" manner, and once a miner finds a valid nonce the block is validated by the other nodes and incorporated into the blockchain.

In light of the above, it is believed that the present invention provides a unique architecture and methodology for more efficiently processing and storing large, Gigabyte-sized blocks in a blockchain network.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which.

DETAILED DESCRIPTION

Figure 1:
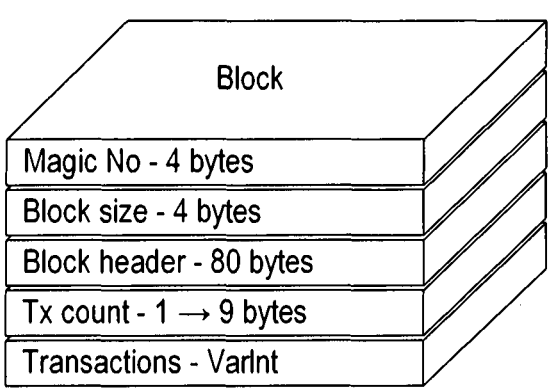
FIG. 1 shows the overall structure of a block.

In this specification a solution to the problem of processing and storing large Gigabyte-sized blocks is described.

Types of Blockchain Network Nodes & Validation Nodes

A blockchain network may be described as a peer-to-peer open membership network which may be joined by anyone, without invitation or without consent from other members. Distributed electronic devices running an instance of the blockchain protocol under which the blockchain network operates may participate in the blockchain network. Such distributed electronic devices may be referred to as nodes. The blockchain protocol may be a Bitcoin protocol, or other cryptocurrency, for example.

The electronic devices that run the blockchain protocol and that form the nodes of the blockchain network may be of various types including, for example, computers such as desktop computers, laptop computers, tablet computers, servers, computer farms, mobile devices such a smartphones, wearable computers such as smart watches or other electronic devices.

Nodes of the blockchain network are coupled to one another using suitable communication technologies which may include wired and wireless communication technologies. In many cases, the blockchain network is implemented at least partly over the Internet, and some of the nodes may be located in geographically dispersed locations.

Currently, nodes maintain a global ledger of all transactions on the blockchain, grouped into blocks each of which contains a hash of the previous block in the chain. The global ledger is a distributed ledger and each node may store a complete copy or a partial copy of the global ledger. Transactions by a node affecting the global ledger are verified by other nodes so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes may be of different types or categories, depending on their functionality. It has been suggested that there are four basic functions associated with a node: wallet, mining, full blockchain maintenance, and network routing. There may be variations of these functions. Nodes may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes communicate with each other using a connection-oriented protocol, such as TCP/IP (Transmission Control Protocol).

An additional type or category of node may be provided: a merchant node (herein referred to at times as an "M-node"). M-nodes are designed to focus on fast propagation of transactions. They may or may not store a full blockchain and do not perform mining functions. In that sense, they are similar to lightweight nodes or wallets; however, they include additional functionality to enable fast propagation of transactions. The operational focus of the M-nodes is the quick validation and propagation of unconfirmed transactions, particularly to other M-nodes, from which the unconfirmed transactions are quickly pushed out to other nodes in the blockchain network. To facilitate this functionality, M-nodes are permitted a greater number of incoming and, particularly, outgoing connections that might otherwise be permitted for nodes under the governing protocol.

The M-nodes may be collectively referred to as the merchant network (or "M-net"). The term "merchant" may be interpreted as meaning "specialised". The M-nodes may be integrated into the blockchain network. Each M-node is a specialized node on the blockchain network that meets certain hardware and performance capabilities that will ensure that it is able to carry out the functions of an M-node. That is, the M-net might be considered a sub-network within and distributed through the blockchain network. The M-Node(s) may be arranged and configured to perform one or more dedicated functions or services.

In order for the M-net to run reliably and be able to offer services at a certain security level, the M-nodes need to maintain a good overview of the whole M-net and thus an efficient routing protocol needs to be in place. Every time an M-node receives an initiating transaction it needs to broadcast it to several other M-nodes, as well as other nodes. In the context of the M-net, this amounts to finding a solution to the multiple traveling salesman problem (MTSP). There are a plethora of solutions that address this issue, any one of which may be employed in the M-net. The M-nodes each run routing optimization in some, up-to-date form.

In some implementations, the M-net is implemented as a decentralized IP multicast type of network. That is, to enable fast proliferation of an incoming transaction to the blockchain network, multicast may be used to ensure that the transaction is broadcast quickly throughout the M-net, allowing all the M-nodes to then focus on forwarding the transaction to other nodes in the blockchain network.

A multicast network architecture allows the possibility of simultaneous distribution of data towards a group of destination nodes, without data duplication for each of the nodes interested in receiving the information. If a node wants to receive a multicast transmission, it joins the multicast group (registration phase) and after that it will be able to receive all the data sent over the multicast group. IP multicast can scale to a larger receiver population by not requiring prior knowledge of how many receivers there are and the network infrastructure is used efficiently by requiring the source to send a packet only once. For the nature of a multicast network, the use of connection oriented protocols (like TCP) is impractical due to simultaneous communication with a large number other nodes. Accordingly, a connectionless protocol is used.

Some blockchain networks, such as Bitcoin, use TCP for node-to-node communications. Data packets sent using TCP have an associated sequence number which is used for ordering purposes. In addition to this, the TCP protocol involves a three-way handshake procedure, both when establishing a connection as well as terminating one. Packets sent over TCP come with an overhead associated, they have a sequence number associated and there is a three-way handshake protocol. In establishing a connection 128-136 bytes are being transmitted, whereas closing a connection costs 160 bytes. Thus the handshake in packet transmission costs up to 296 bytes. Additionally, when a node receives a new transaction, it notifies the other nodes with an inventory (INV) message which contains the hash of the transaction. A node which receives an INV message checks whether the hash of that transaction has been seen before; if not, the node will request the transaction by sending a GETDATA message. The time necessary to transmit a transaction from Node A to Node B is T1=verification+TCP(inv+getdata+tx), where TCP( ) indicates the overhead, in terms of time, introduced by the TCP handshake procedure.

The M-nodes may be configured to use TCP for communications with other nodes where that is mandated by an existing protocol, like Bitcoin. However, they may use a connectionless protocol, like User Datagram Protocol (UDP), for communications from M-node to M-node, or even more suitably from M-node to multiple M-nodes in a multicast situation. Unlike TCP, UDP does not involve a handshake protocol so the M-node is able to propagate transactions more quickly. This can also avoid having a malicious node tie up other nodes by sending repeated INV messages without ever sending an actual transaction.

The lightweight nature of UDP is associated with certain trade-offs. There is less error checking and no error recovery. In some implementations, these limitations of UDP can be overcome at the application level through implementing error recovery, ordering and re-transmission as functionalities of the application layer. Placing error checking at the application level removes the overhead from the network.

In one example situation, a regular node on the blockchain network generates a transaction that it wishes to have processed via the M-net, such as a merchant-based payment. It may send the transaction to an M-node, which then broadcasts it to other M-nodes using multicast, or it may send the transaction directly to multiple M-node if it knows the IP multicast address for the M-nodes. In some examples, all M-nodes of the M-net are members of a single multicast address, so all transactions sent to that address are received by all M-nodes; however, in some cases, there may be more than one multicast address associated with the M-net, and a receiving M-node may assess, from routing information, whether further broadcast of the transaction to other multicast addresses is required to propagate the transaction to the full M-net.

Multicast assists in ensuring fast initial propagation of new transactions to all M-nodes; however, the multicast solution does not necessarily address a scalability problem with the blockchain network that comes from an increased transaction throughput. Each node in the network typically maintains a mempool containing the unconfirmed transactions it has seen and that have not yet been incorporated into the blockchain by a miner completing a proof-of-work. A significant growth in the number of transactions coming from use in payment processing would increase the volume of transactions to store in each mempool. Accordingly, although the nodes in the M-net are able to receive a new transaction almost at the same time, they may have storage capabilities limitations with respect to a large and quickly changing mempool.

To address this problem, the M-nodes may use a shared mempool implemented by way of a Distributed Hash Table (DHT) as an alternative to using multicast.

Assuming an average size of a transaction (TX) of 500 bytes and a transaction rate of ~$10^4$ TX/s, the M-net may receive ~400 GB of daily incoming data. All of this data needs to be stored for varying amounts of time in a mempool of unconfirmed transactions. Accordingly, the M-net requires significant storage and the capability to store data fast. In order not to put too many requirements on each individual M-node, the M-nodes implement a shared mempool which relies on a DHT. Instead of having each M-node keep all incoming TXs in its own mempool, each M-node only stores a certain fraction of the total, and hashes and associated key values of the rest.

DHTs are a class of decentralized distributed systems which allows the membership partitioning of a key set among nodes and which are able to send messages in an efficient and optimized manner only to the owner of a given key. Each node of a network can be seen as a cell of an array of a hash table. DHTs are designed for managing a high number of nodes, allowing the possibility for new nodes to join the network, old nodes to leave and crash without compromising the integrity of the shared data. DHTs ensure decentralization (there is no central authority, nor central coordination), scalability (the system has an efficient behaviour with millions of nodes), and fault tolerance (the system is reliable and able to manage nodes which join and leave the network or crash). Each node of the network may stay in touch with only a small number of other nodes, hence in the presence of a change or a new piece of data, the network is not overloaded.

The same concept may be applied for the UTXO database, a database which contains the set of all unspent outputs on the blockchain. An UTXO database may be built using a DHT in order to share the content among a set of nodes.

There are a number of possible DHT architectures and protocols that may be used to implement a shared mempool for the M-net. One example is Pastry™, although there are many others. Pastry™ is a protocol designed for maintaining an overlay network able to store and transfer information on a distributed system. Each node in the Pastry™ network is assigned a 128-bit identifier, which is used to indicate a node's position in a circular nodeID space (ranging from 0 to $2^{128}-1$). The ID is assigned randomly when a node joins the network. Each node maintains a routing table, a neighbourhood set and a leaf set.

One factor to consider in dimensioning a robust DHT is the number of replicas needed to ensure robustness and reliability of the whole network. As already mentioned, nodes can join and leave the network, and this fact should not affect the availability of data. If a node which stores a transaction A leaves the network, it is necessary to find the transaction A in another portion of the network. In existing blockchain networks, like Bitcoin for example, the network has a number or blockchain replicas equal to the number of full nodes in the network (an average of 5000 replicas), but this fact affects scalability.

In one M-net configuration, the mempool is not fully replicated at every M-node but, instead, is implemented by way of DHT. To provide for reliability, the DHT may be implemented so as to have some overlap; i.e. each transaction data item is replicated in more than one M-node, although not in every M-node. As an example, the DHT may be implemented so as to specify a minimal number of 2 replicas. This results in a probability of the 2 nodes going down at once in any given hour, assuming complete independence between nodes would be $$\left(\frac{1}{(24*365)}\right)^2 = 1.30*10^{-8}.$$

A process for storing a new transaction in a distributed mempool may thus comprise the following steps where the distributed mempool is implemented using a DHT. The process includes a node sending a transaction to an M-node. The M-node hashes the transaction or the transaction ID, depending on the implementation, to obtain a key value. The key value indicates the M-node or M-nodes (in the case of replicated data) at which the transaction is to be stored. The M-node then stores the transaction in the distributed mempool, which may include routing the transaction to the correct M-node(s) at which it is to be stored based on the key value and the assigned IDs of the M-nodes in the M-net. The M-node may receive an acknowledgement, depending on the DHT protocol involved. When an M-node receives a new transaction from a regular node, the M-node may perform certain validation operations to verify the authenticity of the transaction.

The transaction may be hashed to generate a key for the transaction. The key may indicate where in the DHT the transaction should be stored, which may be at a node other than the current M-node. The M-node then assesses whether the transaction is already in the DHT in operation. Each M-node has a portion of the stored transactions based on a division of the keyspace amongst the M-nodes that make up the M-net. In some configurations, the keyspace is divided among the participating M-nodes. The division may involve overlapping so as to cause replication for resiliency of the network. In some implementations, such as using Pastry™, each M-node is assigned a unique key or ID number and transactions may be stored at the M-node or M-nodes (in the case where replication is desired) based on proximity to the transaction's key value. The M-nodes may have a stored portion of the transactions locally and hashes or key values of the rest. Accordingly, the M-node may be able to evaluate whether the new transaction is in the DHT based on local data in operation.

If the transaction is not in the DHT, the M-node then, in operation, stores the transaction in the DHT based on its key value. In a general sense this may take the form of a put(k, tx) operation, where k is the key value and tx is the transaction. The applicable DHT routing protocol ensures that the transaction is sent to and stored at the appropriate M-node(s). The DHT may operate in accordance with various protocols for distributed hash tables depending on the implementation selected. The use of DHT for storing a transaction in the M-net avoids the use of INV/GETDATA messages within the M-net to route the transaction to every M-node.

In operation the M-node may, in this example, send the transaction to regular nodes in the blockchain network in accordance with the normal transaction forwarding protocols of the blockchain network. For example, the communication to ordinary nodes may employ TCP for node-to-node connections.

In one configuration, an M-node includes a processor, a network interface and memory. The M-node may be implemented using any suitable computing hardware having network connectivity and sufficient processing and memory resources to carry out the functions described herein. The M-node may include processor-executable instructions to implement the functions described herein. In some cases, the processor-executable instructions may be referred to as a blockchain merchant node application, although it will be appreciated that the instructions may be implemented in one or more modules, applications, scripts or other programming structures, depending on the hardware and operating system. The processor may include a multi-core processor, and/or multiple processors.

The memory stores data, including an assigned portion of the DHT-based mempool, based, in part, on its DHT key value, i.e. the M-node ID. In this example implementation, the memory further stores a routing table, neighbourhood set, and leaf set. The routing table contains a list of specific routing destinations within the M-net, and when a node receives a packet of data, it references the routing table to know where to send that data. The routing table may also contain information on how far each destination is from the M-node. The neighbourhood set contains information about close M-nodes based on, for example, proximity metrics (ping latency). The leaf set contains numerically close M-nodes. M-nodes are numerically close if their key values (node ID) are numerically close. The memory further includes an M-node reputation table, as will be further explained below.

To provide for scalability, in addition to implementing the mempool using a DHT, the M-net allows for nodes to join the M-net. A new node will need to have the address of at least one M-node already part of the M-net so that it can direct its join request to one of the M-nodes. The M-node may perform certain validation actions, which may involve querying the new node. For example, the M-net may have a set of minimum criteria associated with joining the M-net that it specifies to the M-nodes. As an illustration, the criteria may include minimum processing resources available, or minimum free memory available, or connectivity requirements.

Assuming the M-node completes whatever validation operations are performed to vet the new node, it then forward a joinrequest( ) to the DHT in accordance with whatever DHT protocol governs operation of the DHT. The DHT then communicates with the new node to provide it with a routing table, key value (node ID), and any other data to enable the new node to function as a new M-node on the M-net.

It will be appreciated that the ease with which a node is able to join the M-net creates a vulnerability in that a malicious node may join the network. In order to identify and isolate a potential malicious node, one configuration provides for the M-nodes to store an M-node reputation table to be used for tracking and updating node behaviour ranking. When a new node joins the network, the node may be added to the M-node reputation table, as indicated by a node ID field. The table may further include a join time in some implementations. The table further includes a score or rating for that M-node.

The score may be adjusted up or down based on certain behaviour metrics. For example, if the M-node fails to forward transactions, remains silent for a period of time, floods the M-net with traffic determined to be non-transactional, or otherwise engages in negative behaviour, its ranking may be dropped or decremented. If a node's score falls below a preset minimum, then it may be excluded from the M-net.

The M-node reputation table maintained at a particular M-node may be limited to tracking scores of its neighbours, rather than the full M-net. Accordingly, when a new M-node joins the network at the time t, the M-node reputation tables of its neighbours do not contain any information about the new node, but from the moment t they start building a reputation of the new node storing the information in the nodes register table. For example, if the new node is a silent node, meaning that it does not transfer the information it receives over the network, all the neighbours start recording this behaviour in their respective M-node reputation tables, for example assigning a negative value to the ID of new node. After a certain time t+n, if the M-node reputation tables of all the nodes which are aware of the new node, contain a negative value, the nodes may decide to isolate the new node and ban it from the network.

Transactions in the distributed mempool of the M-net may wait for a significant period of time before being confirmed, i.e. before being incorporated into a block that is added to the blockchain and confirmed. A block is considered "confirmed" when a sufficient number of subsequent blocks have been added to the blockchain above it such that it would be computationally impractical to reverse the growth in the chain and remove the block in order to change to a different branch or fork.

Because of the size and flexibility of the mempool and the volume of transactions, it is possible that a given transaction may be unconfirmed for longer than in some blockchain implementations, like Bitcoin. In a conventional Bitcoin implementation, a transaction is removed from the mempool as soon as it is incorporated into a block. This means that if the block ends up being an orphan block that all the transactions in the block are retransmitted on the network. This may be impractical or may result in long delays for confirming certain transactions in the case of a fast transaction network.

Accordingly, in some implementations, the mempool may track the number of confirmations of the block into which the transaction has been incorporated, i.e. the number of blocks added to the blockchain subsequent to the block in which the transaction is incorporated. Only after a predetermined number of confirmations have occurred is the transaction removed from the mempool. The predetermined number may be 4, 5, 6, 7 or any suitable number for a given implementation. A mempool data entry may be structured to include a transaction ID field, a transaction field, and a number of confirmations (NoC) field. In another implementation, rather than tracking the NoC, the mempool data entry may simply record the block number. From the block number it can assess, based on the current block number of the blockchain, how many confirmations have occurred.

Once the requisite number of confirmations has occurred, the transaction may be safely removed from the mempool. In this way there is no transactions-loss in case of orphan blocks, and a transaction will be permanently removed after the requisite number of confirmations.

The solution as described in the following portion of this specification utilizes a modified type of the fast validation nodes as previously described. A new full node configuration is described, which effectively is the M-nodes validation architecture enhanced with large scale storage capability and a modified operational protocol. Together the M-nodes and the storage nodes make up the core of the new full nodes. The new node structure is described in detail, including the technical requirements and technical solutions necessary, and a sustainable incentivisation model is provided.

Block Size and Storage Requirements

The current block size is 1 Mb. Currently a block consists of fields containing a so-called magic number (always the same value), the value indicating the actual size of the block, a so called block header, the number of transactions contained in the block and, finally, the list of actual transactions. The latter always starts with the coinbase transaction, which is the transaction containing the reward for mining the block. In FIG. 1 the overall structure of a block is shown.

The block header contains the following:
1. Version number (4 bytes)
2. Hash of previous block header (32 bytes)
3. Merkle root hash (32 bytes)
4. Time (4 bytes)
5. Target threshold (encoded as nBits−4 bytes)
6. Nonce (4 bytes)

Currently a block contains approximately 2000 transactions and a block is mined approximately every 10 minutes (the 10 minute block time was set as a compromise between first confirmation time and the time wasted on chain splits).

This provides a transaction rate of approximately 3.5 transactions per second with a theoretical maximum of 7 transactions per second. In contrast VISA operates with a rate of approximately 10000 transactions per second and is capable of reaching 50000+ transactions per second.

It is clear that in order to create a competitive payment system, some sort of circumvention of the current constraints will be necessary. As the 10 minute block time is well established, it is imperative to consider changes to the block size and thus the blockchain itself. In this specification a scalable solution is described that would be able to handle, for example, approximately 50000 transactions per second.

Increments to the current block size or even complete removal of the limit is a much debated and, at times contentious topic. There seems to be strong arguments on both side, since both retaining the current size as well as increasing it has significant benefits and trade-offs.

Assuming a transaction rate, r, we can calculate the necessary block size. In the following an (average) 10 minute blocktime is assumed. Thus, let T(r) be the number of transactions per block. We have $$T(r) = r \cdot 6 \cdot 10^2 \text{ block}^{-1}$$

If $s_{Tx}$ is the average transaction size in bytes then the block size $B(r, s_{Tx})$ can be expressed as $$B(r, s_{Tx}) = s_{Tx} \cdot T(r) = s_{Tx} \cdot r \cdot 6 \cdot 10^2$$

Hence, considering the scenario where r=50000 Txs/s and $s_{Tx}$=500 bytes, a quick back-of-the-envelope calculation yields:

$$T(50000) = 5 \cdot 10^4 \frac{Tx}{s} \cdot 6 \cdot 10^2 \frac{s}{block} = 3 \cdot 10^7 \frac{Tx}{block}$$

$$\Downarrow$$

$$B(50000, 500) = 3 \cdot 10^7 \frac{Tx}{block} \cdot 5 \cdot 10^2 \frac{bytes}{Tx} = 15 \text{ Gb/block}$$

This, in turn, leads to a storage requirement of $O(10^6)$ Gb/year. It is quite apparent that with blocks of this size, we need slightly different approaches to both block propagation and storage. Table 1 below shows the relationship between the transaction rate, average transaction size, block size and the amount of monthly and annual storage space needed.

TABLE 1

Relationship between the transaction rate, average transaction size, block size and the amount of monthly and annual storage space needed.

| Rate (Tx/s) | Tx size avg. (Bytes) | Tx/block | Block size (Mb) | Storage (Gb/month) | Storage (Tb/year) |
|---|---|---|---|---|---|
| 10 | 250 | 6000 | 1.50 | 6.6 | 0.1 |
| 10 | 500 | 6000 | 3.00 | 13.1 | 0.2 |
| 10 | 1000 | 6000 | 6.00 | 26.3 | 0.3 |
| 100 | 250 | 60000 | 15.00 | 65.7 | 0.8 |
| 100 | 500 | 60000 | 30.00 | 131.4 | 1.6 |
| 100 | 1000 | 60000 | 60.00 | 262.8 | 3.2 |
| 1000 | 250 | 600000 | 150.00 | 657.0 | 7.9 |
| 1000 | 500 | 600000 | 300.00 | 1314.0 | 15.8 |
| 1000 | 1000 | 600000 | 600.00 | 2628.0 | 31.5 |
| 10000 | 250 | 6000000 | 1500.00 | 6570.0 | 78.8 |
| 10000 | 500 | 6000000 | 3000.00 | 13140.0 | 157.7 |
| 10000 | 1000 | 6000000 | 6000.00 | 26280.0 | 315.4 |
| 100000 | 250 | 60000000 | 15000.00 | 65700.0 | 788.4 |
| 100000 | 500 | 60000000 | 30000.00 | 131400.0 | 1576.8 |
| 100000 | 1000 | 60000000 | 60000.00 | 262800.0 | 3153.6 |

A New Bitcoin Network

Figure 2:
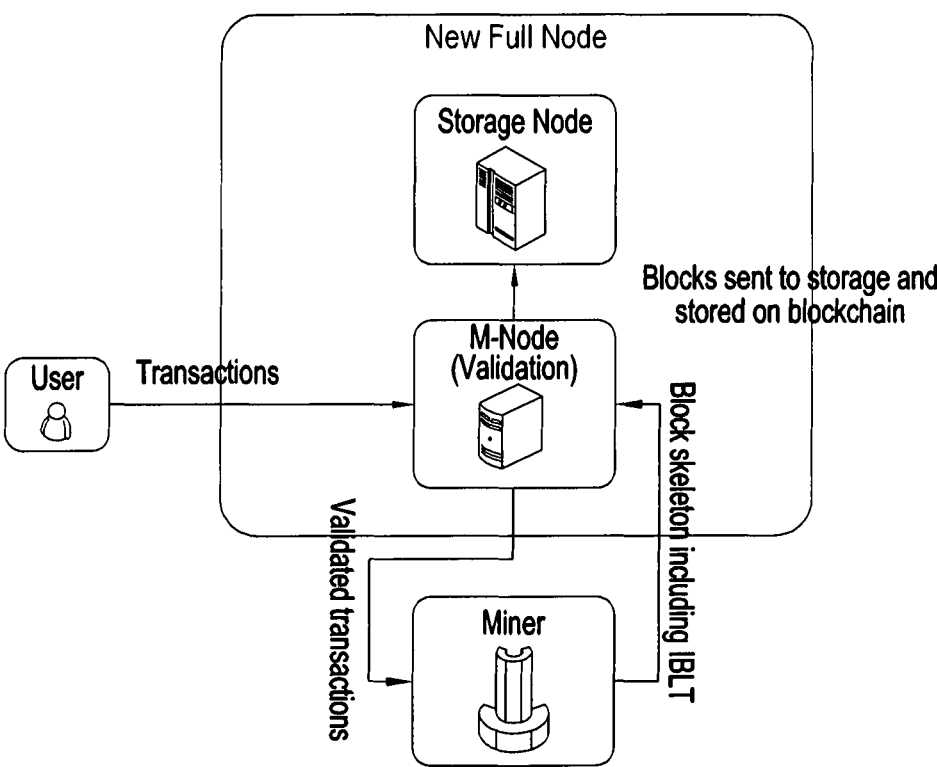
FIG. 2 shows a modified architecture for the Bitcoin network in terms of an operational diagram illustrating the steps from the moment a user submits a transaction until it ends up on the blockchain.

The architecture we propose for the Bitcoin network is illustrated in FIG. 2 which shows an operational diagram indicating the steps from the moment a user submits a transaction until it ends up on the blockchain.

A system is provided where special validation nodes (which maintain a shared mempool between themselves by means of a distributed hash table DHT) receive transactions, validate them, and allocate them in the mempool. The validation nodes then offer their service, which is to provide a list of valid transactions hashes, to the miners. The miners assemble pre-blocks (block skeletons), based on those hashes and attempt to solve the hash puzzles. When a solution to the puzzle has been found, the winning miner sends a block skeleton back to the validation nodes. These validate the block and ensure it is stored. Initially, it will be possible and feasible for the validation nodes to store the blocks themselves. When the block size eventually exceeds a certain threshold in size the validation nodes will either: a) extend their own storage capability; or b) outsource storing to specialized storage nodes. The two architectures are discussed later in this specification.

New Full Nodes

With blocks sizes of the order O(10) GB it no longer appears feasible to rely on PC-type nodes to provide storage capacity for hosting full images of the blockchain. Instead, facilities offering O(1) PB or more storage are required (see Table 1). The challenge, then, becomes to create a system that accommodates the new blocks while retaining the distributed, decentralized and no-trust nature of the network.

Two types of full node structures, and also a combination of these two types are envisaged:

1. Validation nodes with an associated petabyte storage rack
2. Validation nodes with an associated storage pools based on an internally decentralized, distributed peer-to-peer (P2P) single node network, much like the current Bitcoin network itself
3. A combination of 1 and 2.

The proposed solution attempts to solve the problem of keeping a distributed and decentralized record of the blockchain at all times by introducing nodes resembling the so-called full nodes operating on today's Bitcoin network but which, in contrast, have the ability to scale with the growing size of the blocks and number of transactions.

The difference is not limited to purely structural and hardware related issues. In contrast to home PC-based full nodes operating at the time of writing, the new nodes proposed here would be specialized nodes. They will require a fair amount of investment and thus, the incentivisation will be very different. In the scalable paradigm, both M-nodes (validation nodes) as well as new full nodes (combined validation and storage nodes) will be expecting compensation for their services.

At the other end of the spectrum, we have the decentralized and distributed storage solutions, largely made up of individual nodes. Good examples are Storj (Wilkinson et al., 2016), Sia (NebulousLabs) and MaidSafe (maidsafe). In the case of Storj, its functionality is based on participants getting rewarded for offering storage space.

As mentioned, it is also possible to imagine super-nodes, which are comprised of both Petabyte (Pb) racks and peer-to-peer (P2P) storage systems.

Since the Bitcoin ecosystem relies heavily on the existence of multiple replicas of the whole blockchain distributed in a decentralized way, it becomes clear that it is important that all full nodes are compensated. This is very different from mining, which is essentially a game where the winner takes the whole prize. Because the miners will rely on their (winning) blocks to end up on the public blockchain it will be in their interest to reward the storing full nodes.

Nodes will group into pools that will act as super-nodes. In order to maintain the distributed nature of the blockchain, there has to be a certain number of such super-nodes ($\geq$100). The super-nodes are connected but non-overlapping.

Technical Requirements

As mentioned, there are two, overall differing architectures to be considered when discussing new full nodes (see Table 2).

New full nodes will need to maintain two types of storage:
1) Random Access Memory (RAM)-like Distributed Hash Table (DHT) memory/storage for the mempool.
2) Permanent tape-/disk-like storage for the blockchain.

As mentioned, for transaction rates r=50000 Tx/s the blocks are expected to be O(10) Gb which means an annual storage requirement of ~365×24×6×15 Gb=7.9·$10^5$ Gb=0.8 Pb/yr (see Table 1).

Table 2 shows a comparison between current full nodes and future full nodes:

| Feature | Current full node | New full node |
|---|---|---|
| Mempool | Yes | Yes |
| Mempool size | ~10-100 Mb | ~0.1-1 Tb |
| Mempool type | RAM with fee-based lower cap | DHT with "unlimited" storage |
| Disk space/yr | ~100 Gb | ~1 Pb |
| Transaction validation | yes | yes |
| Block-validation | yes | yes |

Figure 3:
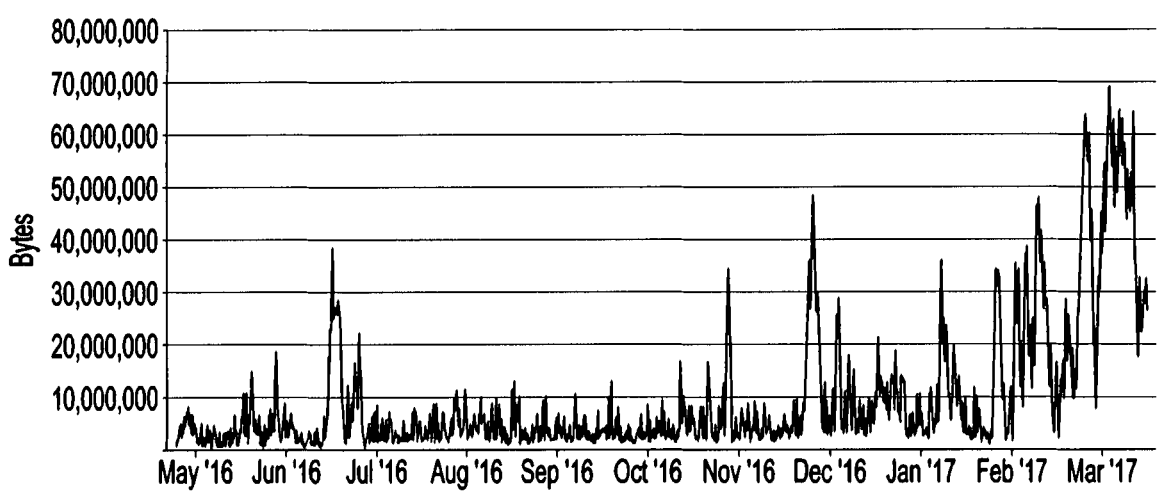
FIG. 3 shows a graph indicating an example of the aggregate size of transactions waiting in the mempool for confirmation.

At the same time the racks/clusters need to maintain a mempool. This will allow for quick block restoration. The necessary size of the mempool is more difficult to assess. Currently, with block sizes of approximately 1 Megabyte (~1 Mb) and approximately 4 transactions per second (~4 Tx/s), the aggregate size of transactions waiting in the mempool oscillate between 2 and approximately 70 Megabytes (~70 Mb). FIG. 3 shows a graph indicating the aggregate size of transactions waiting in the mempool for confirmation.

Figure 4:
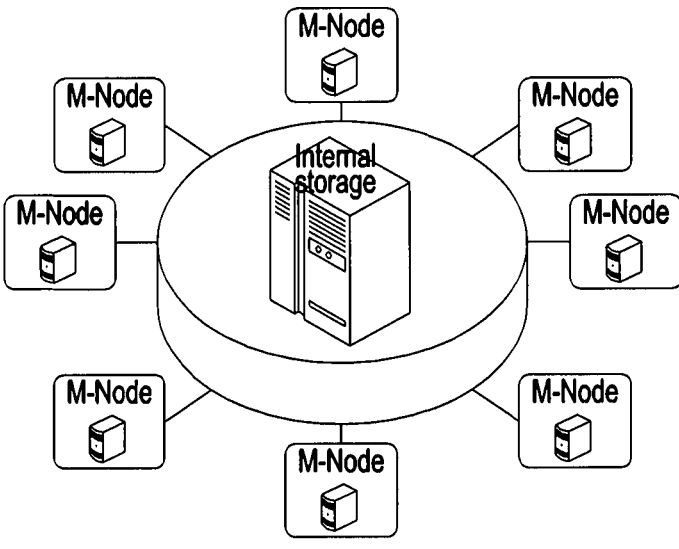
FIG. 4 shows a plurality of nodes linked to an internally centralized storage facility.
Figure 5:
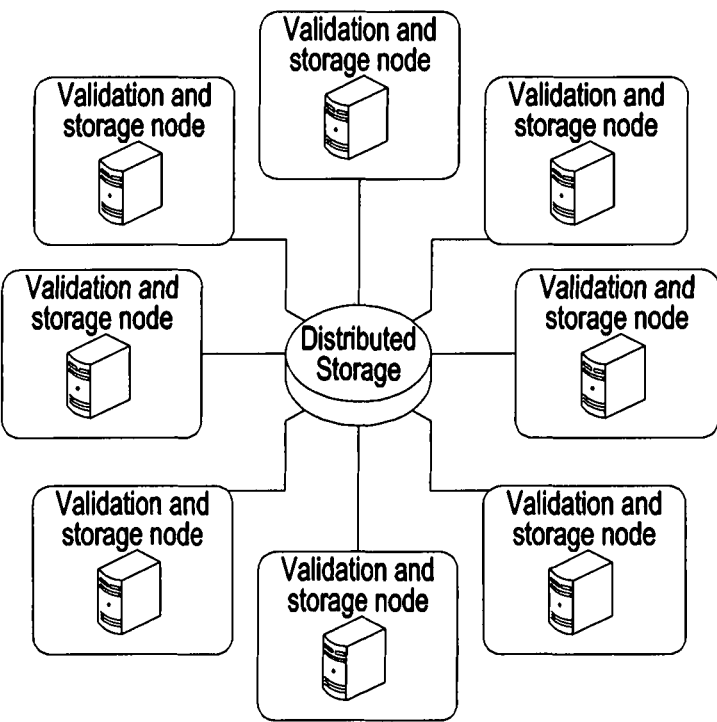
FIG. 5 illustrates a configuration in which each node is part of both a distributed mempool and a distributed storage facility.

As indicated, we envisage two fundamentally different structures, capable of storing large amounts of data, and combinations of those. The two structures are shown in FIG. 4 and FIG. 5. FIG. 4 shows a configuration comprising a plurality of nodes with access to an internally centralized storage facility. FIG. 5 illustrates a configuration in which each node is part of both a distributed mempool and a distributed storage facility. The architecture depicted in FIG. 4 seems suitable for a larger entity that owns and maintains several validation nodes, which all have access to the entity's own storage facility. In contrast, the architecture depicted in FIG. 5 is fully decentralized. It is a solution suitable for individual nodes, such as home owned PC with sufficient storage capacity, that wish to join in shared, distributed storage pool. The underlying storage technology to be used for this, already exists (e.g. Storj, Sia, MaidSafe).

Figure 6:
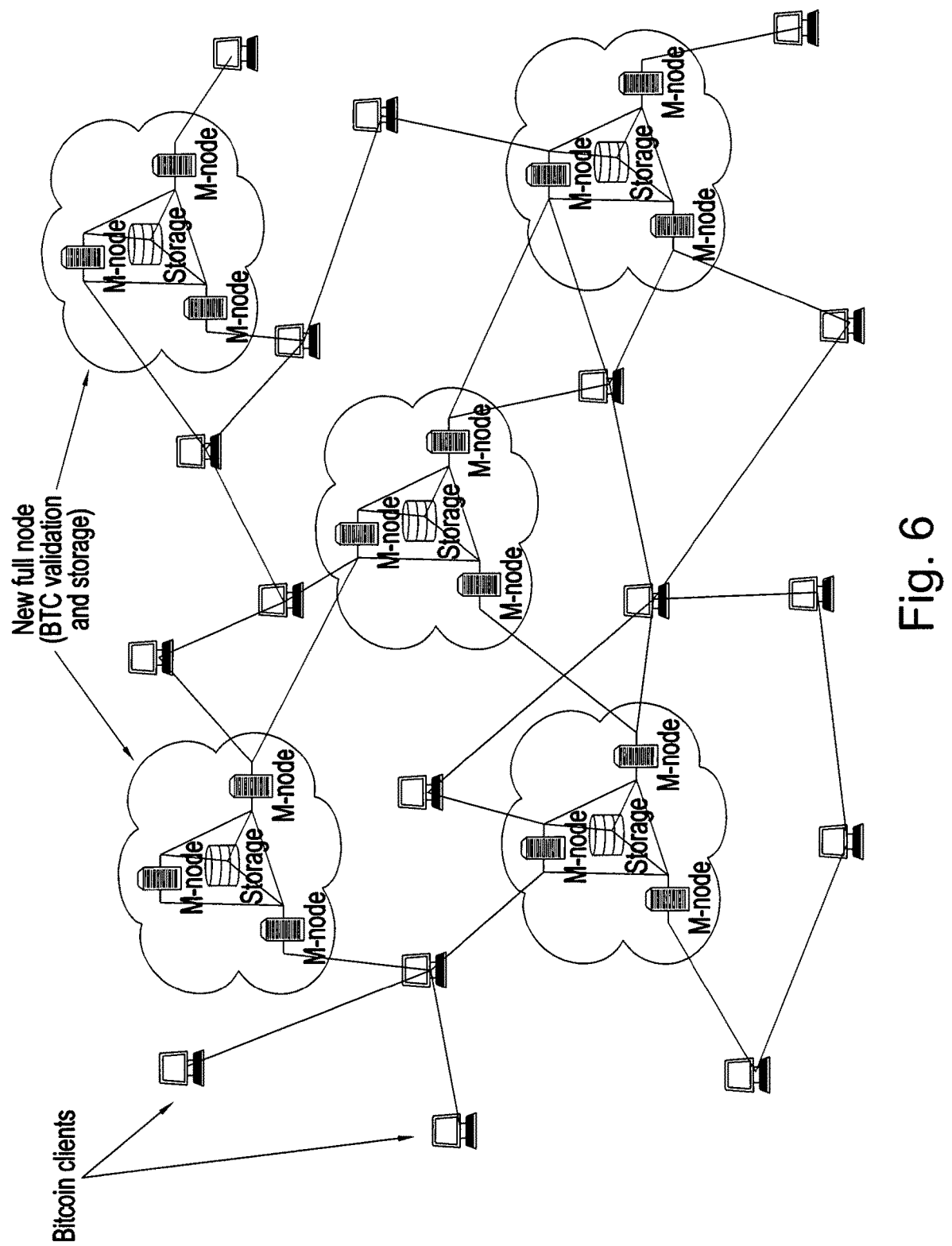
FIG. 6 illustrates how a new node structure fits into the Bitcoin network showing a network configuration in which validation nodes are members of storage pools and together the pools comprise a decentralised and distributed Bitcoin network.

One way of visualizing how the new full nodes fit into the Bitcoin network is shown in FIG. 6 which shows a network configuration in which validation nodes are members of storage pools. Together the pools comprise a decentralised and distributed Bitcoin network.

Full Node Operation

In the large block scenario we face a different situation, not solely due to space requirements. The mempool should be able to accommodate the equivalent of a block, i.e. approximately 15 Gigabytes (~15 Gb) and preferably the equivalent amount for the block to be mined next. This is to be combined with an overhead that needs to be accounted for, as well.

1) The mempools need to synchronize with the other validating nodes. This involves exchanging Invertible Bloom filter Lookup Tables (Michael T. Goodrich, 2011)
2) The IBLTs need to be scrutinized and missing transactions (Tx's) retrieved
3) Additionally retrieved Tx's need to be validated
4) Assembly of blocks, based on block skeletons received from miners or other full nodes A new full node keeps an up-to-date mempool. It does so by means of IBLTs exchanged with miners and other validation- and new full nodes.

The miners send a block skeleton (tuple) consisting of
1. A nonce, n
2. IBLT
3. Coinbase transaction Based on this, the new full node orders the transactions accordingly (in accordance with a specific set of rules) and assembles the newly mined block. New full nodes then proceed with storing the block on their own storage, as well as propagating the skeleton to other new full nodes. The protocol is described in more detail later in this specification.

Incentives

Figure 7:
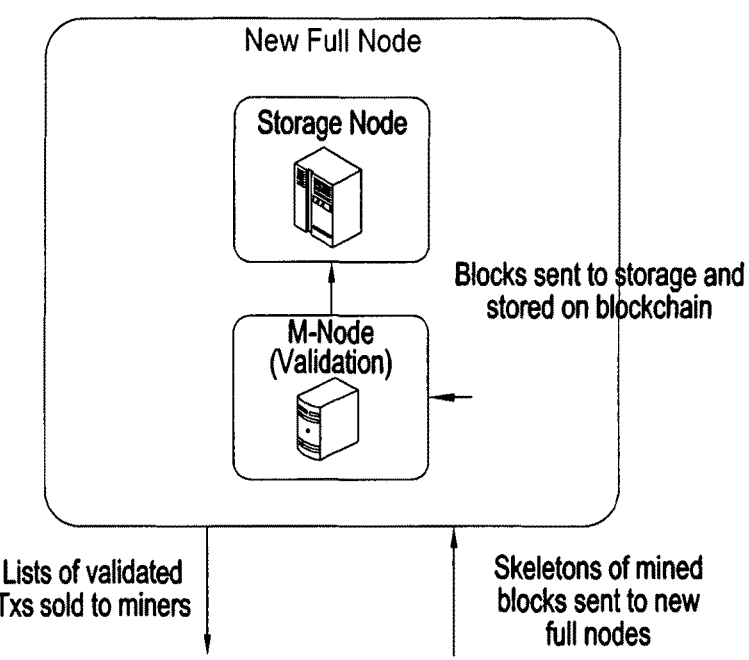
FIG. 7 illustrates functions of the new nodes.

One important feature of certain configurations is to build incentives into the system to incentive the provision of new node structures and services. Incentives are required due to the significant costs associated with storing the blockchain. FIG. 7 shows functions of the new full nodes. New full nodes will be rewarded for two types of services, predominantly:

1) Compiling lists of validated transactions, ready for mining. The hashed values of the transactions (Merkle root) are then sent off to the miners, who choose the list and mine the blocks.
2) The winning miner sends the skeleton of a mined block off to several new full nodes. The skeleton includes the coinbase transaction, which contains:
   a. The mining reward.
   b. A secret which is part of a commitment scheme which is used as a payment mechanism for providing the validated list.
   c. Payment for block validation and/or storage of the block on the blockchain.

The [transaction] validating node will be reimbursed for validation of the transaction by means of a fee-based system. The receiving validating/new full nodes will be rewarded for one or more of:

1) Providing the miners with lists of validated transaction (Tx) hashes (see b. above).
2) Reassembling blocks from block skeletons ("flat" fee).
3) Size of the block ("per-MB-storage" payment).

The incentive lies in the 100 block confirmation time, $T_{100}$.

1) Miners need to wait for $t \sim T_{100}$, in order to claim their rewards.

2) Validation nodes need to wait for $t \sim T_{100}$, before they receive their fee for validating the Txs in the block.

3) New full nodes need to wait $t \sim T_{100}$, before they receive the block assembly fee and the size-dependent storage payment.

Thus, the 100 block confirmation time will provide the necessary incentive for miners to propagate skeleton blocks (including payment) to a range of new full nodes, and new full nodes will be incentivised to propagate the skeleton blocks to other new full.

Also it should be pointed out that the miners are free to choose the lists (of transactions) they wish to be included in a block. We thus envisage a marketplace, consisting of validating nodes competing by compiling lists of validated transactions that miners can choose from and buy by means of commitment transactions.

Mining Revisited

The Bitcoin ecosystem relies on the process of mining. Miners gather transactions (Txs) from the mempool (or as envisaged here, from specialized validation nodes), organize them into blocks and attempt to find a solution (nonce) that solves the hash puzzle. The block header contains the hash of the previous block on the blockchain, the root of the Merkle tree of the transactions and the nonce included by the miner. Solving the puzzle consists of calculating the double SHA256 hash of a nonce (iteratively chosen) concatenated with the previous block hash and Merkle root, and checking if it is less than the so-called difficulty target. If it falls below, the puzzle has been solved, if above the iteration over nonces continues. This remains unchanged in the new paradigm. What poses a challenge is the vastly enlarged block size and the distribution of mined blocks across the network. With Gb-sized blocks, it will not necessarily be feasible to broadcast whole blocks over the network.

Instead, we propose a solution that follows the steps:

1. The miners receive a list of validated transactions from the validation/M-nodes and/or new full nodes.

2. Miners themselves may or may not operate their own mempool of Tx hash values, which follows a certain ordering convention. An example of such ordering is given in [https://www.cryptocoinsnews.com/bitcoin-in-bloom-how-iblts-allow-bitcoin-scale/].

3. Miners solve hash puzzles by determining a nonce, n.

4. Next, a hash tree (Merkle tree, here referred to as HT) is calculated and the root of the tree stored (see next section).

5. This list of Txs is used to create an IBLT. The IBLT can be used to calculate the difference in content between two sets (e.g. mempool), and to reconcile the two sets.

6. The tuple (n; IBLT; CoinBase Tx; HT root) is broadcast to the validation/M-nodes.

7. The new full nodes operate DHTs for mempools and storage for the blockchain.

8. The pools re-assemble the blocks based on the tuples (n; IBLT; CoinBase Tx; HT root) and record the block on the blockchain, either by a) storing the block themselves or b) by storing on a specialized storage node.

Avoiding a Race Between Miners

The miners will be able to choose list of validated transactions from a marketplace consisting of several validating nodes. Unless stated otherwise, it is fair to assume that the miners will be choosing the lists that maximize their potential revenue. The attentive reader may point out that this could lead to miners choosing the same list from the same node, predominantly. This, in turn, would lead to a situation where several miners would race against each other, trying to mine the same block. This would favour the miner(s) with the largest amount of hashing power.

We propose to add an extra field to the block header. This field contains a random number chosen by each miner. This guarantees that each miner starts with a different starting point, and will thus prevent that solving block solely comes down to hashing power. This, in turn, will mimic the situation now where miners tend to mine similar, but individually chosen and slightly differing blocks.

Protocols

Here we describe the protocol necessary to operate the new full nodes.

In order for the proposed system to function the mempools of the nodes involved (validators, miners, new full nodes . . . ) should follow an ordering convention for the transactions. Here we propose to use the canonical ordering that, in turn, was proposed by Gavin Andresen. There, the ordering pertained to the list of transactions in the block, but here we put forward the idea that all validating and new full nodes use the same convention for their mempools.

The convention can be summarized as follows:

1) Sort the transactions in ascending order with respect to the previous transaction hash.

2) From the sorted list add first transactions that do not depend on later transactions.

As seen previously, blocks contain a so-called Merkle root hash. It is a produced by hashing all the transactions, including the coinbase transaction and subsequently hashing concatenations of the hashes until the Merkle root hash is reached. It becomes apparent that if it were not for the fact that the miner is producing the coinbase transaction, the validation nodes could calculate the entire Merkle tree and, hence, the Merkle root and corresponding hash.

Here we propose the Merkle tree to be calculated by means of a procedure in the following way:

The validator node calculates a Little Merkle Root. The procedure is the same as when calculating a standard Merkle root, with several exceptions:

1) The coinbase transaction is left out.

2) A so-called commitment transaction is included.

3) The miner produces the coinbase transaction, concatenates it with the Little Merkle root hash which yields the Merkle root hash.

Figure 8:
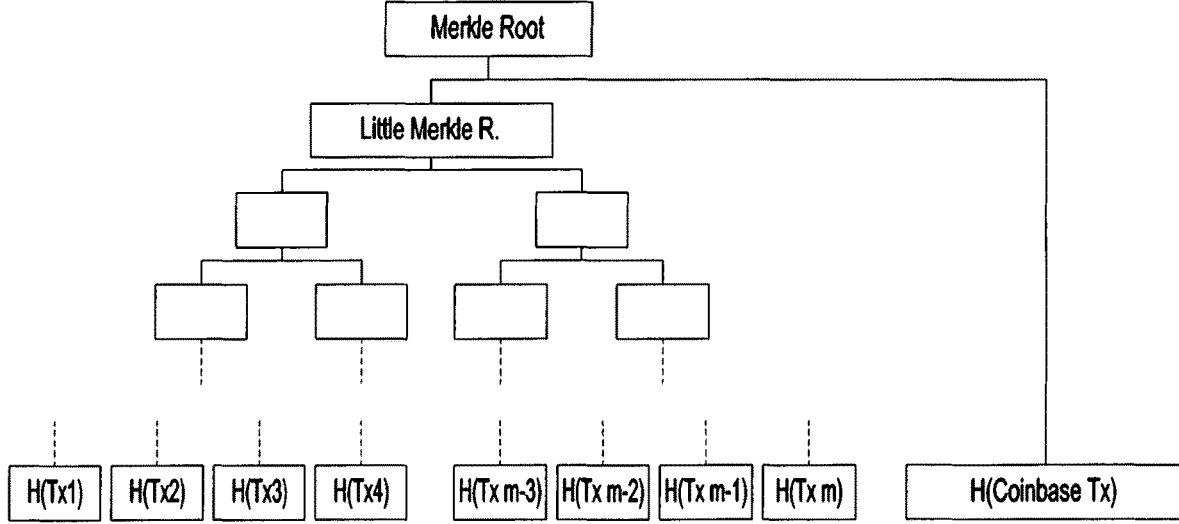
FIG. 8 illustrates a new Merkle Tree structure that constitutes a modification to the current protocol.

This is shown in FIG. 8 which illustrates a new Merkle Tree structure. Note that this constitutes a modification to the current protocol.

Modification to the Block Header

As mentioned, we propose to add an extra field, containing a random number chosen by the miner, to the block header. Thus, solving the hash puzzle changes in the following way:

$$\text{SHA256[SHA256[Prev. Block Hash} \parallel \text{Merkle Root} \parallel \text{nonce]]}$$

$$\text{SHA256[SHA256[RND} \parallel \text{Prev. Block Hash} \parallel \text{Merkle Root} \parallel \text{nonce]]}$$

21

We thus propose that the block header of the mined new blocks are enhanced with an extra field, containing the random number. The block header will contain the following:

1. Version number (4 bytes)
2. Hash of previous block header (32 bytes)
3. Merkle root hash (32 bytes)
4. Time (4 bytes)
5. Target threshold (encoded as nBits–4 bytes)
6. Nonce (4 bytes)
7. Random number (4 bytes)

Validation→Miner

Validation Node:

Upon request, the validating node (which may or may not be a new full node) prepares a list of validated transactions to be mined.

The validator node creates a commitment transaction.

The so-called Little Merkle Root (see preceding subsection) is calculated, with the commitment transaction included.

The validator node prepares two IBLTs:
  1) for all the transactions in the block (IBLT1); and
  2) for all the corresponding TxIDs in the block (IBLT2)

The validator node sends off to the miner:
  1) Little Merkle Root.
  2) IBLT1.
  3) IBLT2 (Optional—only if miner operates with own TxID/mempool).
  4) The previous block hash.
  5) A hash checksum of the above.

Miner:

Upon reception of the data from the validator node, the miner proceeds with creating a coinbase transaction, which includes the reward for mining, as well as rewards for the block validation/storage of the new full nodes the miner wishes to send the mined block to. Furthermore, the coinbase transaction contains an output field with a secret, matching the secret in the commitment transaction.

The miner uses the Little Merkle Root, received from the validator node, and combines it with the coinbase transaction in order to create the Merkle Root hash.

The miner now has the all the information necessary to begin solving the hash puzzle.

Mining proceeds along the lines described earlier.

Miner→New Full Node

Miner:

When a block has been mined the miner sends the following to a list of new full nodes:
  The nonce (solution to the puzzle), n.
  Coinbase transaction.
  Block header.
  Merkle Root.
  Little Merkle Root.
  IBLT1.
  IBLT2 (Optional).
  The hash checksum.

New Full Node:

Checks if the appropriate reward is in the coinbase transaction.

The node checks that the received data are consistent, by calculating the checksum (hash).

The node uses IBLT1 to make sure that the transactions in the block are present in the mempool.

Querying the mempool using IBLT1 the node assembles the block. The block is then stored (see section on new full nodes and storage).

The data received from the miner is broadcast to other new full nodes.

Customised Transaction Lists

We envisage a situation where the market of validated transactions will adapt to the need of the miners. Miners will tend to pick the list that maximises their potential and the validating M-nodes will be picking up on such trends.

There may be cases where miners may wish to customize their blocks by combining transactions from two or more lists. It is possible to carry out set reconciliation between two sets by calculating the difference between two IBLTs. The miner would then send back the IBLT containing the differences to one of the providing nodes and this way retrieve the information necessary to make a list, which contains all the transactions in both lists.

It appears that should miners want to compile their own lists based on several lists introduces additional challenges. Here, we briefly address the various points.

If miners were to combine lists from various validating nodes it is not clear how the Merkle root should be combined. Here we propose the following:
  to construct a Big Little Merkle root of the individual Little Merkle roots; and combine the Big Little Merkle root with the coinbase transaction.

Additional expenses are not proportional to the amount of additional transactions added to list/block. Since it is fair to assume that the various mempools will be overlapping considerably, combining lists will amount to adding a few (relatively speaking) transaction from a different list. Yet, in order to combine the lists the miner will have to "buy" the full lists (by means of commitment transactions) from each validating node. It remains to be seen whether this would be a profitable approach for the miners.

Combining lists from several validating nodes requires a commitment between the miner and each of the providing validating nodes. It is possible to imagine an abuse of this system, by the miner. At present there is no rule/protocol enforcing that all the commitment transactions would end up in the block. One possibility is that the validating nodes can check each block and veto those blocks that contain their transactions.

Summary

Today's Bitcoin network is heavily centred around mining, in terms of computational effort. With vastly increased volumes of transactions this is not necessarily going to be feasible. The solution described in this specification leads to relegation of various tasks to accordingly specialised nodes, and where miners become even more specialised themselves. Compiling lists of validated transactions, re-constructing blocks based on block skeletons, and storing are all functions that will require significant resources. Hence, the structure of the Bitcoin network is anticipated to change and, together with it, the incentivisation. We have described those issues in detail in this specification.

Of novel elements introduced in this specification we can mention:
  New types of node structure, here called new full nodes or super-nodes, which may or may not be extensions to validating M-nodes.
  The nodes operate with protocols that effectively allow for the broadcast of Gb-sized blocks, both from validating nodes to miners, as well as from miners to new full nodes.

Two overall storage structures for storing the blockchain, which may or may not be part of the proposed new full nodes.

An incentivisation model that allows for the creation of a market of pre-block lists of validated transactions and for post-mining block assembling and storage.

A new Merkle tree structure that frees the miners of the requirement of maintaining their own mempool.

The addition of an extra field in the block header with a random number that is chosen by the miners in order to avoid the act of mining becomes a race purely based on hash power.

Validation is rewarded using special commitment transactions.

Bloom Filters and IBLTs

In this section we summarize the properties of the so-called Bloom filters and an extension to those, called Invertible Bloom Lookup Tables.

Figure 9:
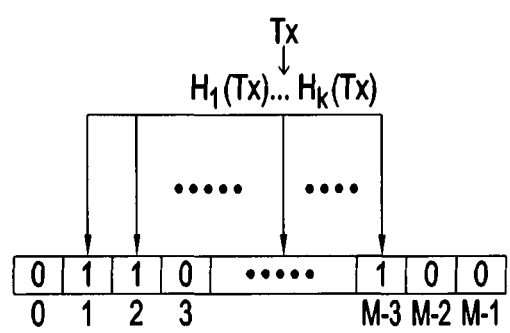
FIG. 9 shows the workflow in creating a Bloom filter.

In its simplest form a Bloom filter is an array. The array has two parameters associated with it, M and k. M is the number of bits in the array and k is the number of different hash functions, $H_k$, such that $$H_1 : S_{16} \rightarrow \{0; M-1\}, \forall i \leq k$$

where $S_{16}$ is the space of hexadecimal strings, on which the hash functions are acting. In order to determine if a transaction, $Tx_0$, belongs to the set the Bloom filter has been made for, we need to calculate $H_1 (Tx_0) \ldots H_k(Tx_0)$ and subsequently check if the corresponding bits are set to 1 in the array. FIG. 9 shows the workflow in creating a Bloom filter.

If one or more are not, then $Tx_0$ is definitely not in the set queried. Bloom filters do, however, allow for false positives. This comes from the fact that the probability of a hash function to change a bit to 1 is p=1/|size of array|=1/M. Thus, a bit is not set to 1 by a give hash function with the so-called $$1 - p = 1 - \frac{1}{M}$$

Hence, if there are k hash functions the probability of a given bit not being set to 1 is $$\bar{P} = (1-p)^k = \left(1 - \frac{1}{M}\right)^k$$

If n elements need to be inserted this becomes $$\bar{P}_n = (1-p)^{kn} = \left(1 - \frac{1}{M}\right)^{kn}$$

One apparent shortcoming of the Bloom filter is that it does not keep track nor maintain any particular ordering. It quickly becomes clear that if we wish to maintain an indexing of items that are to be filtered we need to extend the capabilities of the filter. This is where Invertible Bloom Filters (IBFs) and Invertible Bloom Lookup Tables (IBLTs) come in.

Figure 10:
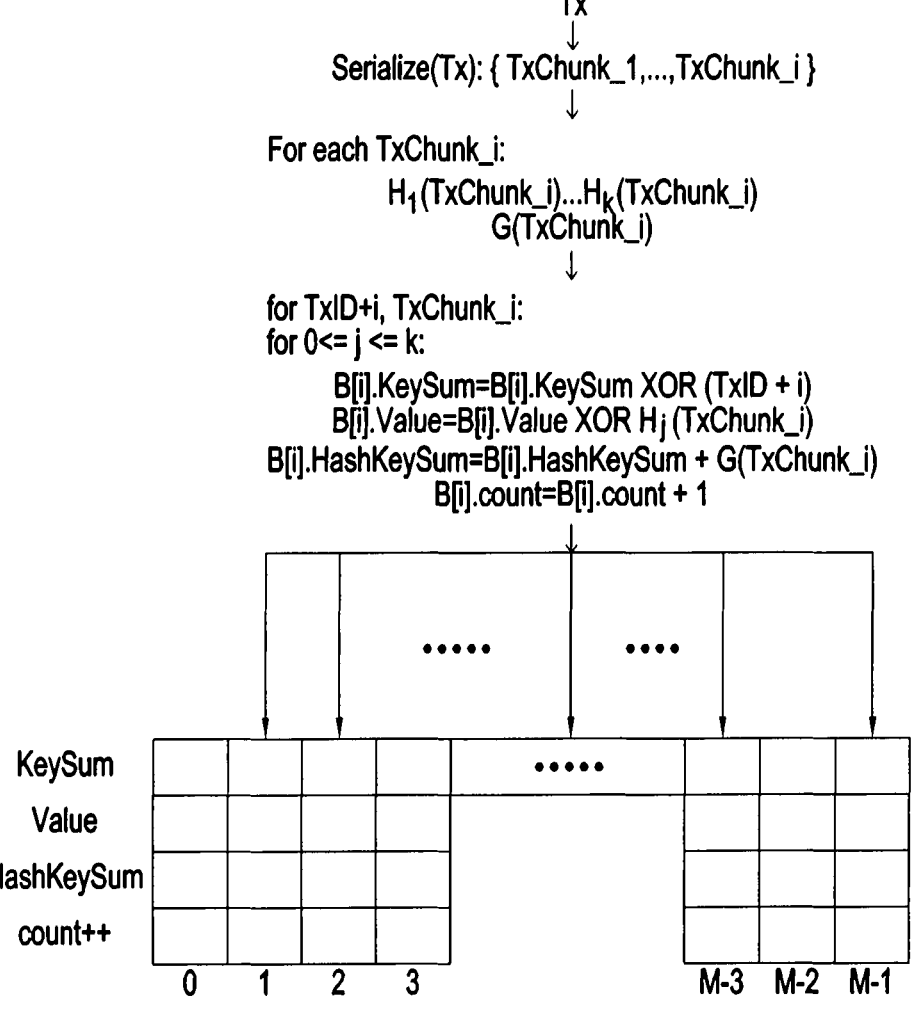
FIG. 10 shows the workflow illustrating how transactions are encoded in Invertible Bloom Filters (IBFs) and Invertible Bloom Lookup Tables (IBLTs).

Instead of only activating bits in an array, the XOR sum of keys, Hashed values (like before) and an overall counter are stored in each field of the IBF. The procedure is illustrated in FIG. 10 which shows the workflow illustrating how transactions are encoded in an IBF/IBLT.

Applications

Let us assume that we have two nodes, $N_1$ and $N_2$, maintaining mempools $m_1$ and $m_2$, respectively. Each mempool contains elements from a universe of hexstrings, $S_{16}$. Let us further assume that the mempools follow an ordering convention as proposed by Andresen and outlined previously in this specification.

Now, $N_1$ sends $m_1$ to $N_2$. $N_2$ can now approach set reconciliation in two ways:

1) Calculate the set difference by $\Delta m = m_2 - m_1$ (see (David Eppstein, 2011), (Michael T. Goodrich, 2011))
2) Iterate over transactions in $m_2$ and check is they are present in mempool of $N_1$ We see that IBLT can be used for at least two purposes:

1) To have nodes assemble mined blocks based on the transactions they already have in their mempool, and help identify and retrieve those they don't have.
2) Maintain a certain level of synchronization among mempools belonging to different nodes.

It is to be understood that while transactions may transfer Bitcoins, users may instead exchange other resources using the methods and systems described herein, such as information, contracts, and tokens. A token represents an asset or resource according to a smart contract associated with the token, such that control of the token affords control of the asset or resource. The smart contract itself may be stored off-blockchain, or it may be stored inside one or more transactions.

REFERENCES

*An Integrated World.* (n.d.). Retrieved from https://www.an-integratedworld.com/whats-in-a-block/

David Eppstein, M. T. (2011). What's the Difference? Efficient Set Reconciliation without Prior Context. *ACM.*

*maidsafe.* (n.d.). Retrieved from github.com: https://github-.com/maidsafe/Whitepapers Michael T. Goodrich, M. M. (2011). Invertible Bloom Lookup Tables. *Communication, Control, and Computing (Allerton), 2011 49th Annual Allerton Conference on.*

*NebulousLabs.* (n.d.). Retrieved from github.com: https://github.com/NebulousLabs/Sia

*O*(1) *Block Propagation.* (n.d.). Retrieved from github.com: https://gist.github.com/gavinandresen/e20c3b5a1d4b97f79ac2

*Wikipedia.* (n.d.). Retrieved from https://en.wikipedia.org/wiki/Distributed_hash_table Wilkinson et al. (2016, Dec. 15). Retrieved from https://storj.io/storj.pdf It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
receiving, by a validation node, mined data from a mining node in a blockchain network, the validation node distinct from the mining node, the mined data corresponding to a plurality of validated transactions established on a blockchain, wherein the mined data received from the blockchain network comprises a block header corresponding to the validated transactions and further comprises a transaction for a digital asset in exchange for assembling blocks and storing the assembled blocks;
assembling, by the validation node, the blocks based on a canonical ordering system that ensures a globally consistent order of transactions across the blockchain network to form the assembled blocks, the canonical ordering system specifying that the plurality of transactions are sorted in ascending order with respect to a previous transaction hash, and that the first transactions are added to the sorted plurality of transactions, the first transactions not being dependent upon subsequent transactions;
sending, by the validation node the assembled blocks to a storage entity for storing on the blockchain, wherein the storage entity is shared between a plurality of nodes on the blockchain network, the plurality of nodes forming a super-node on the blockchain network, wherein the storage entity comprises one of a common storage node, a distributed storage, or a combination of the two.

2. The computer-implemented method according to claim 1, further comprising a requirement to wait for a time period t associated with a minimum number of blocks prior to receiving the digital asset.

3. The computer-implemented method according to claim 1, wherein the step of assembling blocks based on the mined data comprises assembling large blocks with each large block having a size of at least 2 megabytes.

4. The computer-implemented method according to claim 1, wherein the blocks include a block header containing a random number provided by a miner.

5. The computer-implemented method according to claim 1, further comprising storing of the blocks on the blockchain.

6. The computer-implemented method according to claim 1, further comprising:
receiving transactions from the blockchain network;
validating transactions received from the blockchain network; and
distributing data corresponding to said validated transactions to the blockchain network for mining, the data comprising lists of validated transactions.

7. The computer-implemented method according to claim 1, wherein the step of maintaining the distributed, decentralized storage of validated transactions with other nodes in the blockchain network comprises synchronizing nodes on the blockchain network to maintain an up-to-date list of validated transactions in a decentralized and distributed manner.

8. The computer-implemented method according to claim 7, wherein the nodes, which are synchronized, are synchronized by exchanging invertible bloom filter lookup tables.

9. The computer-implemented method according to claim 6, wherein the validated transactions are sorted into a defined order such that a common ordering system is used across the nodes in the blockchain network for maintaining the distributed, decentralized storage of validated transactions.

10. The computer-implemented method according to claim 6, wherein the step of distributing data corresponding to said validated transactions to the blockchain network for mining comprises:
preparing data corresponding to a list of validated transactions.

11. The computer-implemented method according to claim 6, wherein the data corresponding to the validated transactions is distributed to the blockchain network in the form of invertible bloom look up tables and any accompanying data, wherein the validated transactions are contained in blocks.

12. A non-transitory computer readable storage medium comprising computer-executable instructions which, when executed, configure a processor to perform the computer implemented method of claim 1.

13. An electronic device comprising:
an interface device;
one or more processor(s) coupled to the interface device; and
a memory coupled to the one or more processor(s), the memory having stored thereon computer executable instructions which, when executed, configure the one or more processor(s) to perform the computer implemented method of claim 1.

* * * * *